(12) United States Patent
Fellhauer et al.

(10) Patent No.: US 11,515,921 B2
(45) Date of Patent: *Nov. 29, 2022

(54) RECEIVING DEVICE AND TRANSMISSION DEVICE FOR WIRELESS COMMUNICATION

(71) Applicant: Sony Group Corporation, Tokyo (JP)

(72) Inventors: Felix Fellhauer, Stuttgart (DE); Thomas Handte, Stuttgart (DE); Dana Ciochina, Stuttgart (DE); Nabil Sven Loghin, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/364,901

(22) Filed: Jul. 1, 2021

(65) Prior Publication Data

US 2021/0328649 A1   Oct. 21, 2021

Related U.S. Application Data

(63) Continuation of application No. 16/633,583, filed as application No. PCT/EP2018/072260 on Aug. 16, 2018, now Pat. No. 11,070,274.

(30) Foreign Application Priority Data

Aug. 16, 2017  (EP) .................................... 17186523
Jan. 10, 2018  (EP) .................................... 18151038

(51) Int. Cl.
  *H04B 7/06*  (2006.01)
  *H04L 25/02*  (2006.01)

(52) U.S. Cl.
  CPC ......... *H04B 7/0663* (2013.01); *H04B 7/0617* (2013.01); *H04L 25/0202* (2013.01)

(58) Field of Classification Search
  CPC .. H04B 7/0617; H04B 7/0663; H04B 7/0413; H04B 7/0417; H04B 7/0636; H04L 25/0202
  See application file for complete search history.

(56) References Cited

U.S. PATENT DOCUMENTS 7,676,007 B1 * 3/2010 Choi ...................... H04B 7/066
                                                            375/267
11,070,274 B2 * 7/2021 Fellhauer ............. H04B 7/0617
(Continued)

OTHER PUBLICATIONS

International Search Report and Written Opinion dated Nov. 16, 2018 for PCT/EP2018/072260 filed on Aug. 16, 2018, 14 pages.
(Continued)

*Primary Examiner* — Rahel Guarino
(74) *Attorney, Agent, or Firm* — Xsensus LLP

(57) ABSTRACT

A receiving device for use in a wireless OFDM communication system comprises two or more receive antennas for receiving OFDM signals received over a channel from a transmission device having two or more transmit antennas and applying transmit beamforming, and circuitry configured to perform channel estimation to estimate the channel, generate transmit beamforming information based on the channel estimation, the transmit beamforming information comprising beamforming information per subcarrier or time domain tap, determine a reduced set of transmit beamforming information from the transmit beamforming information, wherein the reduced set comprises beamforming information for a reduced set of subcarriers in the frequency domain or for a reduced set of taps in the time domain, wherein the subcarriers of the reduced set or the taps of the reduced set are determined based on an error criterion, and feed back the reduced set of transmit beamforming information to the transmission device.

15 Claims, 10 Drawing Sheets

(56) References Cited

U.S. PATENT DOCUMENTS

| | | |
|---|---|---|
| 2012/0051408 A1 | 3/2012 | Van Zelst et al. |
| 2014/0348097 A1 | 11/2014 | Park et al. |
| 2015/0289147 A1 | 10/2015 | Lou et al. |
| 2017/0033850 A1* | 2/2017 | Kasher .................. H04L 69/323 |
| 2017/0079027 A1 | 3/2017 | Chun et al. |
| 2018/0019795 A1* | 1/2018 | Zhang .................. H04L 1/0026 |

OTHER PUBLICATIONS

IEEE, "Part 11: Wireless LAN Medium Access Control (MAC) and Physical Layer (PHY) Specifications, Amendment 4: Enhancements for Very High Throughput for Operation in Bands below 6 GHz," IEEE Standard for Information Technology—Telecommunications and information exchange between systems Local and metropolitan area networks—Specific requirements, IEEE Std 802.11ac™—2013, IEEE, NY, USA, 2013, 425 pages.

IEEE, "Part 11: Wireless LAN Medium Access Control (MAC) and Physical Layer (PHY) Specifications—Amendment 7: Enhanced throughput for operation in license-exempt bands above 45 GHz," Draft Standard for Information Technology—Telecommunications and Information Exchange Between Systems—Local and Metropolitan Area Networks—Specific Requirements, IEEE P802.11ay/D0.4, IEEE, NY, USA, May 2017, 259 pages.

Perahia, E., and Stacey, R., "Next generation wireless LANs: 802.11n and 802 11ac," Second Edition, Cambridge University Press, NY, USA, May 2013, 481 pages.

* cited by examiner

| B0 B1 | B2 B3 | B4 B5 | B6 B7 | B8 B9 | B10 B11 | B12 ... B22 |
|---|---|---|---|---|---|---|
| $N_{SS}$ | $N_r$ | $N_{CB}$ | Grouping $N_g$ | Feedback Type | Coefficient Size $N_b$ | Number of subcarriers / taps, $N_C / N_{taps}$ |
| Bits: 2 | 2 | 2 | 2 | 2 | 2 | 10 |

Fig. 8

| $N_{SS}$ | $N_r$ | $N_{CB}$ | Grouping $N_g$ | Feedback Type | Coefficient Size $N_b$ | Number of subcarriers / taps |
|---|---|---|---|---|---|---|
| Bits: 2 | 2 | 2 | $N_{bg}$ | 2 | 2 | 10 |

Fig. 9

RECEIVING DEVICE AND TRANSMISSION DEVICE FOR WIRELESS COMMUNICATION

CROSS-REFERENCE TO RELATED APPLICATIONS

The present application is a continuation of U.S. application Ser. No. 16/633,583, filed Jan. 24, 2020, which is based on PCT filing PCT/EP2018/072260, filed Aug. 16, 2018, and claims priority to EP 17186523.1, filed Aug. 16, 2017, and EP 18151038.9, filed Jan. 10, 2018, the entire contents of each are incorporated herein by reference.

BACKGROUND

Field of the Disclosure

The present disclosure relates to a receiving device and method and to a transmission device and method for use in a wireless OFDM communication system.

Description of Related Art

Transmit beamforming is used in wireless OFDM communication systems. In order to make use of the improved performance by transmit beamforming, beamforming information generated at the receiver is fed back to the transmitter. For this purpose the same communication channel (e.g. at a lower data rate and in inverse direction) as for data communication or a different channel may be used. These feedback channels usually are restricted to low data rates compared to the communication channel in forward direction, which is formed through beamforming and which is used for data communication. Further, feedback of beamforming information is generally performed repeatedly if the channel changes. Hence, there is a need to keep the feedback overhead as small as possible.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a receiving device and method which enables feedback of beamforming information with less overhead. It is a further object to provide a corresponding transmission device and method as well as a corresponding computer program and a non-transitory computer-readable recording medium for implementing said methods.

According to an aspect there is provided a receiving device for use in a wireless OFDM communication system, said receiving device comprising:
two or more receive antennas for receiving OFDM signals received over a channel from a transmission device having two or more transmit antennas and applying transmit beamforming, and
circuitry configured to
perform channel estimation to estimate the channel,
generate transmit beamforming information based on the channel estimation, said transmit beamforming information comprising beamforming information per subcarrier or time domain tap,
determine a reduced set of transmit beamforming information from said transmit beamforming information, wherein said reduced set comprises beamforming information for a reduced set of subcarriers in the frequency domain or for a reduced set of taps in the time domain, wherein the subcarriers of said reduced set or the taps of said reduced set are determined based on an error criterion, and
feed back the reduced set of transmit beamforming information to the transmission device.

According to a further aspect there is provided a transmission device for use in a wireless OFDM communication system, said transmission device comprising:
two or more transmit antennas for transmitting OFDM signals over a channel to a receiving device having two or more receive antennas, and
circuitry configured to
receive a reduced set of transmit beamforming information from the receiving device, wherein said reduced set comprises beamforming information for a reduced set of subcarriers in the frequency domain or for a reduced set of taps in the time domain, wherein the subcarriers of said reduced set or the taps of said reduced set are determined based on an error criterion,
reconstruct transmit beamforming information from the received reduced set of transmit beamforming information, and
apply transmit beamforming by use of the reconstructed transmit beamforming information.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed methods, the disclosed computer program and the disclosed computer-readable recording medium have similar and/or identical further embodiments as the claimed device and as defined in the dependent claims and/or disclosed herein.

One of the aspects of the disclosure is to compress the beamforming information, e.g. beamforming matrices, by exploiting their characteristics in the frequency (subcarrier) domain or in the time (tap) domain. Thus, not the whole beamforming information, e.g. all beamforming matrices for all subcarriers or all taps are fed back by the receiving device to the transmission device, but only a reduced set of beamforming information for a reduced set of subcarriers or taps. This strongly reduces the overhead of the required feedback signaling to the transmission device.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein:

FIG. 8 shows a diagram of an exemplary embodiment of a Beamforming Feedback Control field, FIG. 9 shows a diagram of another exemplary embodiment of a Beamforming Feedback Control field.

DETAILED DESCRIPTION OF THE EMBODIMENTS

Figure 1:
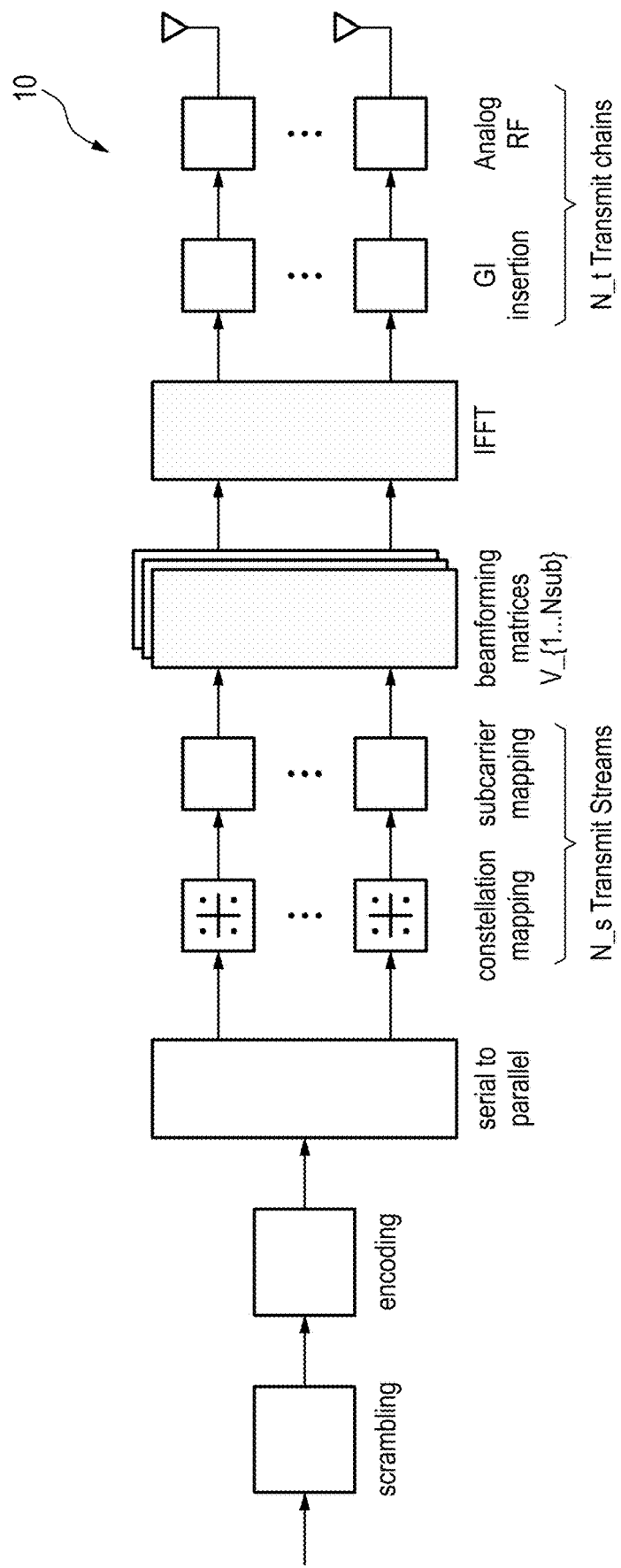
FIG. 1 shows a schematic diagram of the general layout of a transmission device.

In many situations, wireless communication systems can obtain higher communication rates by making use of multiple transmit antennas, also known as MIMO (multiple-inputmultiple-output) if multiple antennas are available at the receiver side or MISO (multipleinput-single-output) if there is only a single antenna available at the receiver side. As the channels between multiple antennas naturally introduce interference between the transmit signals, this interference has to be considered.

The method of doing so is in general called transmit beamforming and necessitates that both, transmitter and receiver agree on the methods to be used and further exchange some information in order to do so. This type of information is usually named beamforming feedback (FB) information.

Mathematically, one favorable solution of mitigating the interference between multiple transmit signals can be formulated as follows:

$$H=UDV^H$$

where H of dimensions $(N_r \times N_t)$ describes a channel between a TX using $N_t$ antennas and a receiver using $N_r$ antennas and $(.)^H$ denotes the Hermitian operator. D is a diagonal matrix of dimensions $(N_s \times N_s)$ with $N_s=\min(N_t, N_r)$, which corresponds to the number of independent streams that can be transmitted from the transmitter (TX) to the receiver (RX). It might also be beneficial to transmit less streams than possible using $N_{s,used} < N_s$. Both matrices V and U can be used together in order to form the diagonal matrix D out of H:

$$D=U^H HV$$

To find matrices U of dimensions $(N_r \times N_{S,used})$ and V of dimension $(N_t \times N_{S,used})$ for a known H there exist efficient methods like singular value decomposition (SVD). The channel matrix H needs to be estimated prior the decomposition by the RX for example based on respective pilot sequences. The equation above implies that the transmitter precodes its transmit data with matrix V, whereas the receiver applies $U^H$ for reception or equalization.

Often the described method to use MIMO for communications is used jointly with orthogonal frequency-division multiplexing (OFDM), which is a method to encode digital data on multiple carrier frequencies. The signals on each of the resulting $N_{sub}$ sub-carriers (or tones) then can be treated independently due to their orthogonality. Furthermore, the sub-carriers can be chosen such that their bandwidth is very narrow and thus the respective channels can be assumed to be constant in frequency domain (narrowband assumption). The full OFDM channel for a MIMO system can thus be described by a three-dimensional matrix H of dimensions $(k \times N_r \times N_t)$ where k describes the subcarrier index in a range of k=1 . . . $N_{sub}$. Especially in wideband communication channels, such as the channels in the 60 GHz bands for mmWave communication, the number of subcarriers $N_{sub}$ can be quite large, which results in large feedback overhead. Therefore, methods are required to reduce this overhead as much as possible.

FIG. 1 shows a schematic diagram of the general layout of a transmission device 10 of an OFDM-MIMO system. The transmit data is first scrambled, encoded and then split up into $N_S$ transmit streams. These streams are then mapped to transmit symbols and further mapped to OFDM subcarriers. In order to perform transmit beamforming, the transmitter needs to have knowledge about the beamforming matrices V for each subcarrier.

Figure 2:
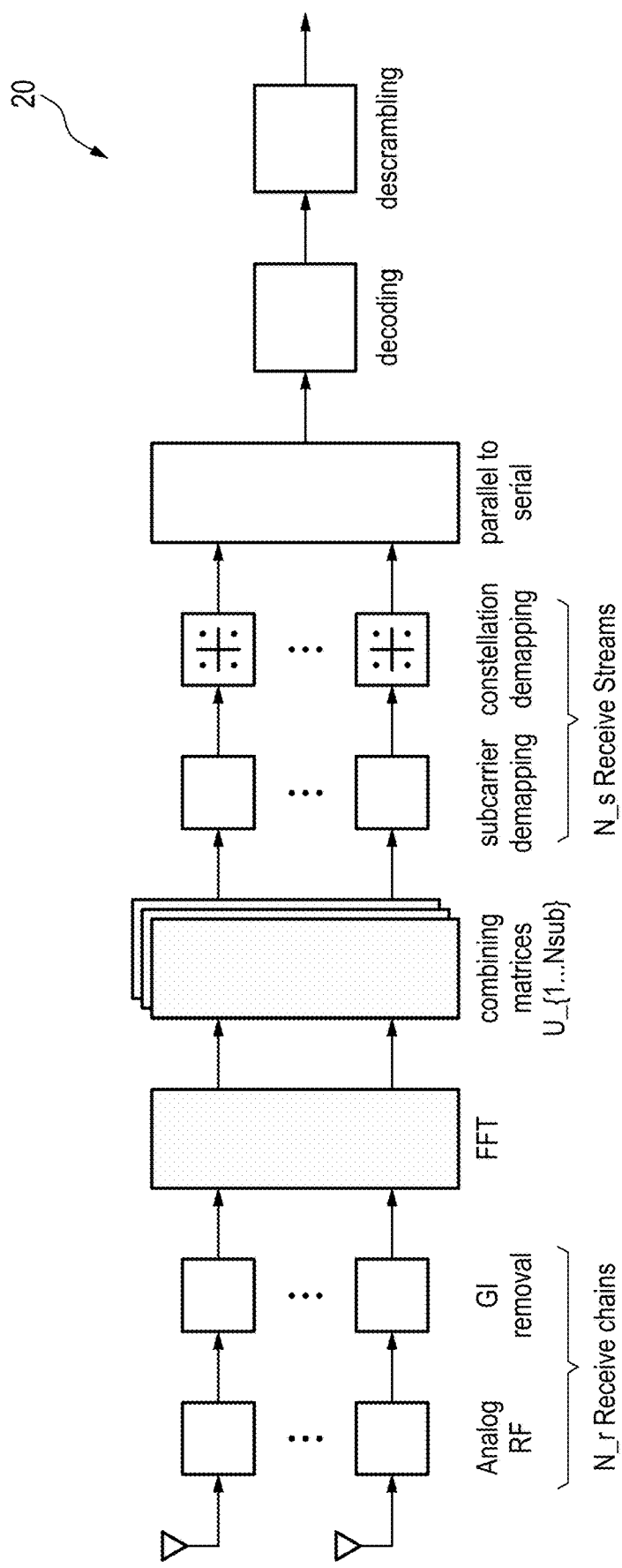
FIG. 2 shows a schematic diagram of the general layout of a receiving device.

FIG. 2 shows a schematic diagram of the general layout of a receiving device 20 of an OFDM-MIMO system. After receiving the signals for all antennas in the time domain, the signals are transformed into the frequency domain and then combined using the combining matrix U.

Figure 3:
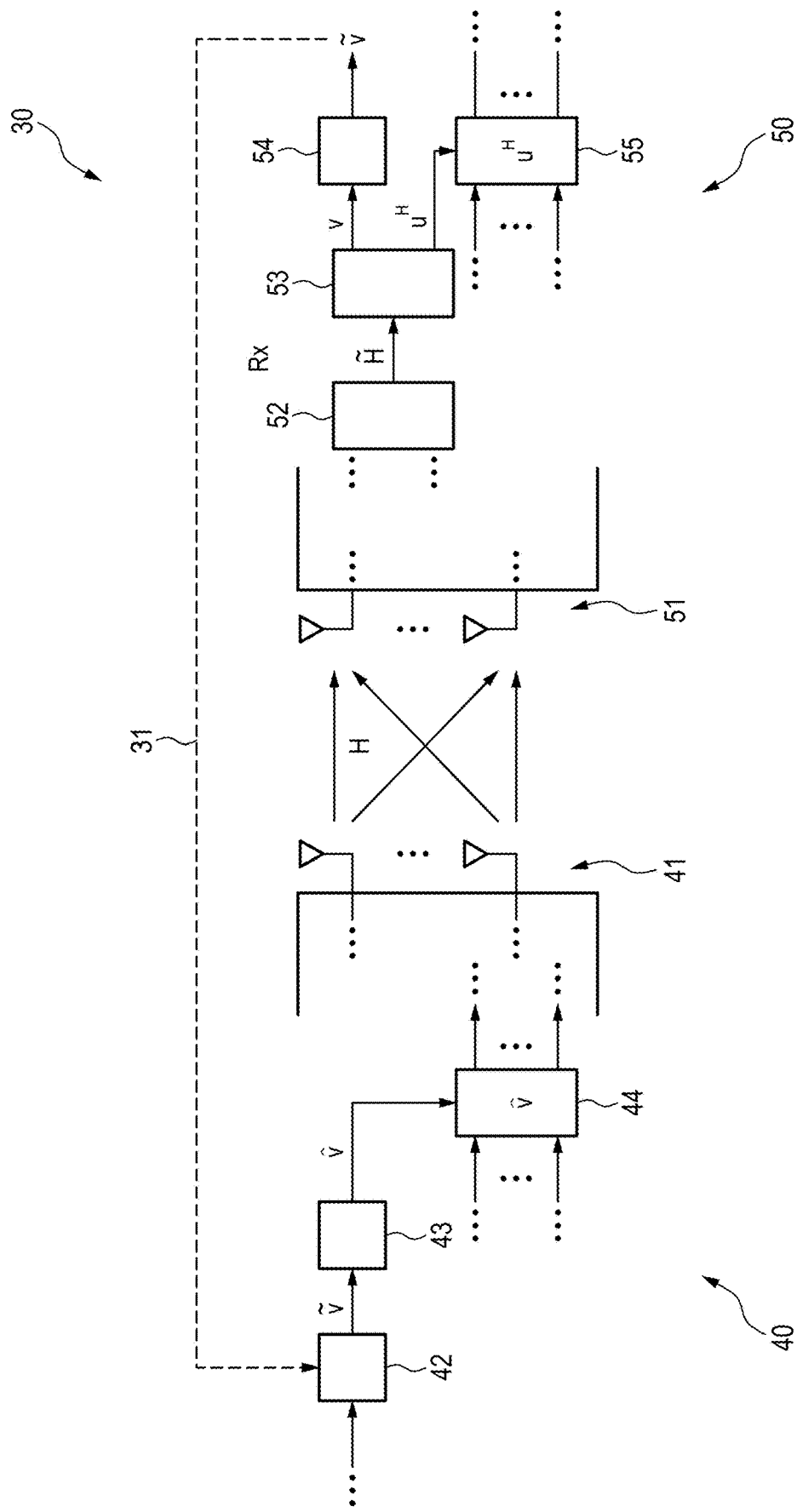
FIG. 3 shows a schematic diagram of a wireless communication system according to the present disclosure illustrating the problem dealt with by the present disclosure.

In order to make use of the improved performance by transmit beamforming, the beamforming information has to be fed back to the transmitter. Therefore the same communication channel (at a lower rate and in inverse direction) as for data communication may be used, but also a different channel can be used. This is illustrated in FIG. 3 showing a schematic diagram of a wireless communication system 30 illustrating the problem dealt with by the present disclosure. The system 30 comprises a transmission device 40 and a receiving device 50 according to the present disclosure, of which only essential elements are shown.

The receiving device (RX) 50 comprises two (or more) receive antennas 51, a channel estimation unit 52 for performing channel estimation, a channel decomposition unit 53 for decomposition to find matrices U and V, a compression unit 54 for compressing the matrix V into a reduced set of transmit beamforming information $\tilde{V}$ (i.e. a compressed version of V) and a receive beamforming unit 55 using the matrix $U^H$ or some other receiver strategy such as MMSE (Minimum Mean Square Error) or Zero-Forcing (ZF). The transmission device (TX) 40 comprises two (or more) transmit antennas 41, a receiving unit 42 for receiving the reduced beamforming information $\tilde{V}$ transmitted by the receiving device 50 via the feedback channel 31, a reconstruction unit 43 for reconstructing the complete transmit beamforming information and a transmit beamforming unit 44 for applying beamforming information $\hat{V}$ (reconstructed version of V) that is reconstructed from reduced beamforming information $\tilde{V}$ for each subcarrier. It should be noted, that receiving device 50 computes U and V, but only applies U, or even none of them (in case of MMSE- or ZF-Receiver).

As these feedback channels usually are restricted to low data rates compared to the beam-formed channel in forward direction (TX to RX) and feedback of beamforming information has to be performed repeatedly if the channel changes, it is advisable to keep the feedback overhead as small as possible and therefore compress the feedback information (at least partly; the feedback information may e.g. include SNR information of the transmitted streams which cannot or needs not be compressed or linearly quantized).

In order to keep the feedback overhead as low as possible there have been methods proposed that compress the beamforming matrices for each subcarrier independently. A simple method discretizes the complex valued entries of beamforming matrix $V_k$ for k-th subcarrier by real and imaginary parts with an appropriate quantization. The quantization resolution and/or spacing can be selected in order to adjust the amount of feedback information, resulting in a total number of real valued variables to be fed back to the TX for each transmit beamforming matrix:

$$N=2 \times N_r \times N_{s,used}.$$

Another method exploits the unitary property of V: Before the beamforming matrix for each subcarrier is fed back to the TX, each matrix is decomposed using the so called "Givens Rotation". After applying this method, the beamforming matrix for a single subcarrier can be represented by a set of $N_\varphi=(N_r \times (N_r+1)/2-N_r)$ φ-angles defined in the range $[0, 2\pi]$ and $N_\theta=(N_r \times (N_r-1)/2)$ θ-angles defined in the range $[0, \pi/2]$.

This representation requires less feedback overhead compared to straight-forward discretization of real and imaginary parts of V. Further the resulting angles can be quantized with different resolutions in order to adjust the amount of feedback overhead. For a simpler notation the notation of $\tilde{V}$ for a compressed beamforming matrix is used at the transmitter side, which can be the outcome of any method for compression. After feedback of the matrix if $\tilde{V}$, the transmitter has to reconstruct the beamforming marices in order to apply them on the transmit signals first. The outcome of this reconstruction process is a beamforming matrix for each subcarrier depicted as $\hat{V}$. The transmitter will not be able to reconstruct the ideal beamforming matrix V after the compression was applied which will result in reduction of the achievable data rates.

In addition to adjust the amount of feedback information to the properties of the underlying communication channel, feedback information of multiple subcarriers can be grouped together. This can be reached by averaging beamforming matrices of multiple adjacent sub-carriers and feedback of the resulting averaged matrix supplemented by the used group width. The current standard IEEE 802.11ac only allows two user equidistant group widths and does not specify the method to be used for combining multiple adjacent V-matrices.

In addition to the known methods for feedback compression, it is proposed in this disclosure to further compress beamforming matrices by exploiting their characteristics in the remaining dimension, namely in the frequency (subcarrier) domain or in the time (tap) domain. This type of compression can be performed in addition to the methods already defined in the legacy standards (like IEEE 802.11ac), wherein the transmit beamforming matrices for each subcarrier are treated independently (excepted for the grouping feature, which is restricted to grouping of a static number of adjacent subcarriers into single beamforming matrix).

One of the ideas of the disclosure is to include only specific transmit beamforming information (e.g. beamforming matrices), also called a reduced set of transmit beamforming information, in the feedback information (so-called support vectors) and skip entries that do not exceed a certain error threshold if skipped. Said error threshold represents an error criterion used according to the present disclosure to select for which subcarriers or taps feedback information shall be included in the feedback information.

Figure 4:
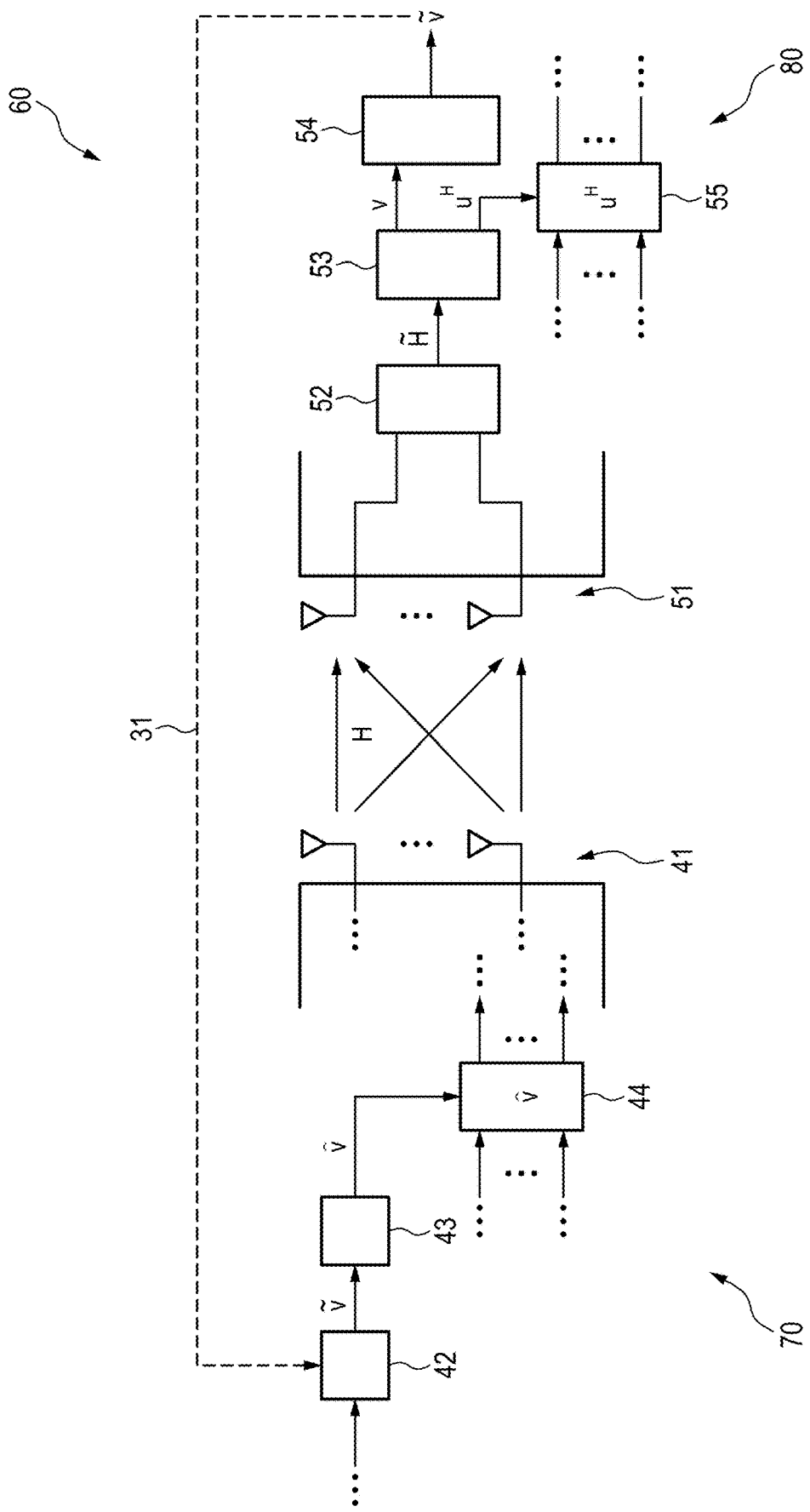
FIG. 4 shows a schematic diagram of a wireless communication system according to the present disclosure including simplified diagrams of a transmission device and a receiving device according to the present disclosure.

FIG. 4 shows a schematic diagram of a corresponding wireless communication system 60 according to the present disclosure including simplified diagrams of a transmission device 70 and a receiving device 80 according to the present disclosure. The receiving device 80 comprises the same elements as the receiving device 50 shown in FIG. 3. However, the compression unit 54 operates differently in this embodiment, as will be explained below. The transmission device 70 comprises the two (or more) transmit antennas 41, the receiving unit 42 for receiving the reduced set of transmit beamforming information transmitted by the receiving device 80 via the feedback channel 31, the reconstruction unit 43 for reconstructing the complete transmit beamforming information and the transmit beamforming unit 44, which also operates differently in this embodiment, for applying transmit beamforming using the reconstructed transmit beamforming information.

According to the present disclosure the following modifications in the implementation of the transmission device and the receiving device may be applied. On the RX-side, an extension of the compression method is made to perform compression of transmit beamforming information over an additional dimension. The feedback information includes an indicator that compression is performed using the additional dimension and additional information where in frequency or time domain the fed back beamforming information has to be applied. On the TX side the reconstruction method of the full set of beamforming is adapted to the compression method applied at the RX side respectively.

When observing the characteristics of transmit beamforming matrices for 60 GHz Hybrid-MIMO channels in the baseband, especially after matrix decomposition using Givens-Rotation has been applied, it can be observed that many of the resulting numeric values (Givens angles) evolve linearly over frequency/subcarrier indices. After applying Givens-decomposition on these matrices, each matrix can be represented by $I=N_\varphi+N_\psi$ (with $$N_\varphi = \left(N_r \times \frac{N_r+1}{2} - N_r\right) \text{ and } N_\psi = \left(N_r \times \frac{N_r-1}{2}\right))$$

real-valued angles, instead of $N_r \times N_{S,used}$ complex numbers (or $2 \times N_r \times N_{S,used}$ real valued numbers). These values are treated as multiple discrete functions $f_i[k]$ (with i=1 . . . I) depending on the subcarrier index k. Here, the function index i can reflect the entries of a V-matrix directly or respective angles after transformation using Givens-Rotation/Gauss-Jordan-Decomposition or other compression methods that treat V for each subcarrier independently.

The number of approximated functions depends on the compression method that is applied prior approximation. If no compression is applied $I=2 \times N_t \times N_{S,used}$ would hold (as real and imaginary parts of each entry of V have to be approximated). If Givens-Rotation was applied, $I=N_\varphi +N_\theta$ would hold.

Then, a vector of support positions in time/frequency domain $s_{app} \cup S_{sub}$ with length J is defined containing a reduced number of all available positions $S_{sub}=\{0, 1, N_{sub}-1\}$. The entries of $S_{app}$ are chosen such that an accumulated error threshold in a segment (between previous support position $s_{app}[j-1]$ and support position $s_{app}[j]$) defined as $$\Delta_{i,j} = \sum_{n=s_{app}[j-1]}^{s_{app}[j]} |f_i[n] - f_{i,approx}[n]|^2$$

does not exceed the predefined error threshold of $\Delta_{i,max}$ for any of the I functions (error threshold may remain constant for all segments j or may be derived dynamically for each segment and/or channel). Each entry of $s_{app}$ then indicates positions for each of the I functions that should be included in the reduced feedback, even if only one of the defined threshold values is reached.

Figure 5:
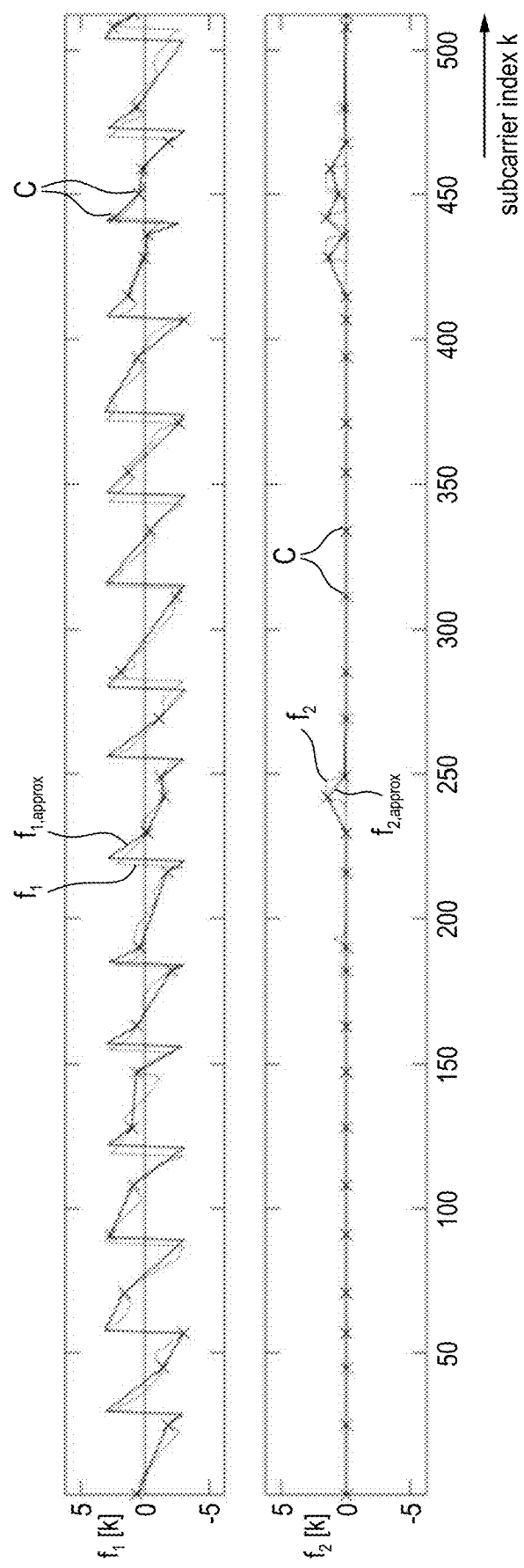
FIG. 5 shows diagrams illustrating a complete set of transmit beamforming information and a reduced set of transmit beamforming information.

In between these support positions different methods of interpolation or approximation to derive $f_{i,approx}$ can be applied. The simplest case of this method can be realized by using linear interpolation. Then each of the initial functions $f_i[k]$ are segment-wise interpolated using linear functions. An example of the outcome of this procedure is shown in FIG. 5 depicting diagrams illustrating a complete set of transmit beamforming information and a reduced set of transmit beamforming information.

Figure 10:
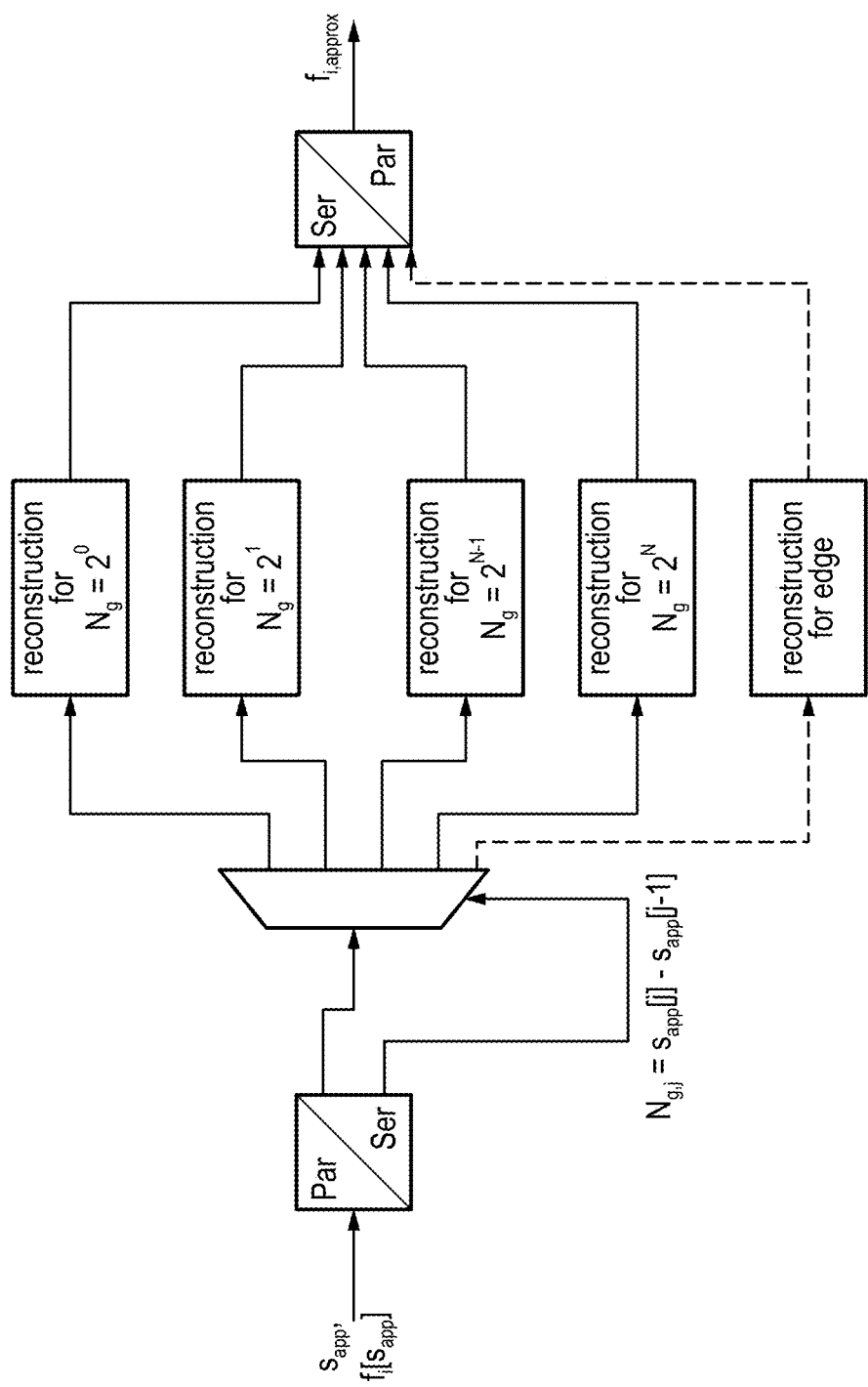
FIG. 10 shows a schematic diagram of a reconstruction unit of the transmission device shown in FIG. 4.

To simplify implementations, further constraints can be imposed on the criterion proposed above. One example is only allowing predefined distances between the subcarriers. Based on this the above described criterion for $\Delta_{i,j}$ changes as follows:

$$\text{find } s_{app}[j] s \cdot th \cdot \sum_{n=s_{app}[j-1]}^{s_{app}[j]} |f_i[n] - f_{i,approx}[n]|^2 \leq \Delta_{max} \text{ and}$$

$$|s_{app}[j] - s_{app}[j-1]| \in S_{FB}$$

where $S_{FB}$ contains values that are predefined e.g., $S_{FB}=\{1, 2, 4, \ldots 2^N\}$. The advantage is that in this case a bank of fixed size linear interpolators can be used to facilitate the reconstruction of the digital beamformers at the transmitter as shown in FIG. 10. FIG. 10 particularly shows a schematic diagram of a device to reconstruct $f_{i,approx}$ by using a bank of reconstructors for fixed group width and $N_{g,j} \in S_{FB}$. This arrangement might be a component of a reconstruction unit 43 depicted in FIG. 4.

Figure 11:
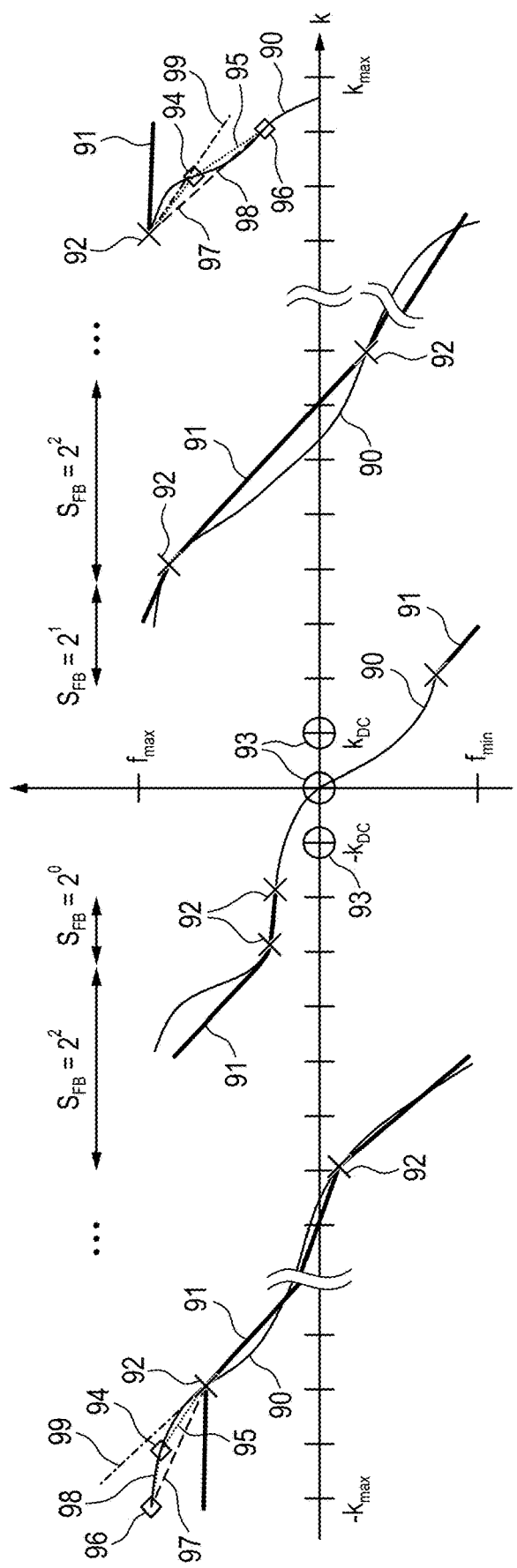
FIG. 11 shows a diagram of an approximated function and a reconstructed function.

The application of this criterion should start from the subcarriers neighboring the DC (direct current, i.e., center) subcarriers and should be moving towards the channel edges. In this way it is ensured that DC subcarriers are not part of the subcarriers being fed back. This is illustrated in FIG. 11 as an example. FIG. 11 shows an approximation 90 of function $f_1[k]$ with dynamic group widths from $S_{FB}=\{2^0, 2^1, \ldots, 2^N\}$, the reconstructed function 91 ($f_{1,approx}[k]$) based on $S_{app}[j]$ (crosses 92), see the above equation. DC subcarriers are excluded (as indicated by circles 93).

The condition can be relaxed at the channel edges in order to allow these to be part of the signaling and the transmitter to correctly reconstruct the pre-coders. Multiple options exist, as depicted in FIG. 11:

a. Include all leftover subcarriers with $S_{FB}=1$ (see diamond 94 and dotted line 95 for resulting respective $f_{1,approx}$);
b. Include only last subcarrier (see plus 96 and dashed line 97);
c. Do not include any further subcarriers, resulting in constant continuation of value (solid line 98) or slope (dash-dotted line 99).

Since subcarriers at the edge of a channel or corresponding to edges of channels being part of a bonded channel should be present, optionally a reconstruction unit with a size different than $N_g$ can be present and this is marked with dashed line in FIG. 10.

A further constraint can be imposed on top of the option a. to ensure that $S_{app}[j]$ does not belong to the set of indexes indicating the pilot positions.

FIG. 5 particularly shows a visualization of approximated $I=2$ functions $f_1$ and $f_2$ over frequency (subcarrier index k) using $J=34 \ll N_{sub}=512$ dynamically placed support positions (crosses C) resulting in approximations $f_{1,approx}$ and $f_{2,approx}$, which reflect V-matrices of dimension ($N_t=2 \times N_s=2$) that were first decomposed into two angles for each subcarrier using Givens-Rotation. The regression/interpolation methods can be used directly on angles obtained by Givens rotation matrices or can be applied on transformations of these, which take into account the fact that precoders are invariant to multiplications with a constant phase. Thus the V-matrices for a particular subcarrier can be multiplied prior to applying Givens rotations with constant phase term which may be chosen to compensate for an isolated variation in one of the angles e.g. as occurring on $f_2$ in FIG. 5 or to improve the linearization, e.g. by finding a multiplication phase factor for which the maximum error or the sum error of the linearization is the smallest.

The reduced set of subcarriers/taps, for which beamforming information is included in the reduced set of transmit beamforming information, thus comprises subcarriers/taps, where the distance between adjacent subcarriers/taps may be equal or unequal and may even be different for different pairs of adjacent subcarriers/taps, i.e. there may be a dynamic width in between adjacent subcarriers/taps.

Different kinds of compressed transmit beamforming information may be fed back from the receiving device to the transmission device according to embodiments of the present disclosure. Beamforming matrices may be compressed along the dimension of time or frequency, i.e. the feedback overhead may be reduced over the frequency-domain or the time-domain according to one of the following methods:

a. by differential signaling (between subcarriers), which means that beamforming matrices are signaled not absolutely, but with respect to some reference (e.g. preceding subcarrier/tap);
b. by grouping, which means that an averaging over multiple subcarriers is applied in order to reduce beamforming feedback information;
c. by linear/nonlinear interpolation or regression over groups (static width), as described above, but with a static (i.e. fixed for all channels) set of reduced support vectors $s_{app}$;
d. by linear/nonlinear interpolation or regression over dynamic groups, as described above;
e. by reduction of channel state information (CSI) in time domain; or
f. by reduction of V in time domain.

Further, alternatively or in addition, beamforming matrices may be compressed independently for each subcarrier. A single transmit beamforming matrix V may be compressed according to one of the following methods:

g. by linear quantization;
h. by decomposition using Givens-Rotation (as described above);
i. by decomposition using Gauss-Jordan-Elimination; or
j. by transforming Cartesian complex-valued entries of V-matrices in polar coordinates before quantization.

Figure 6:
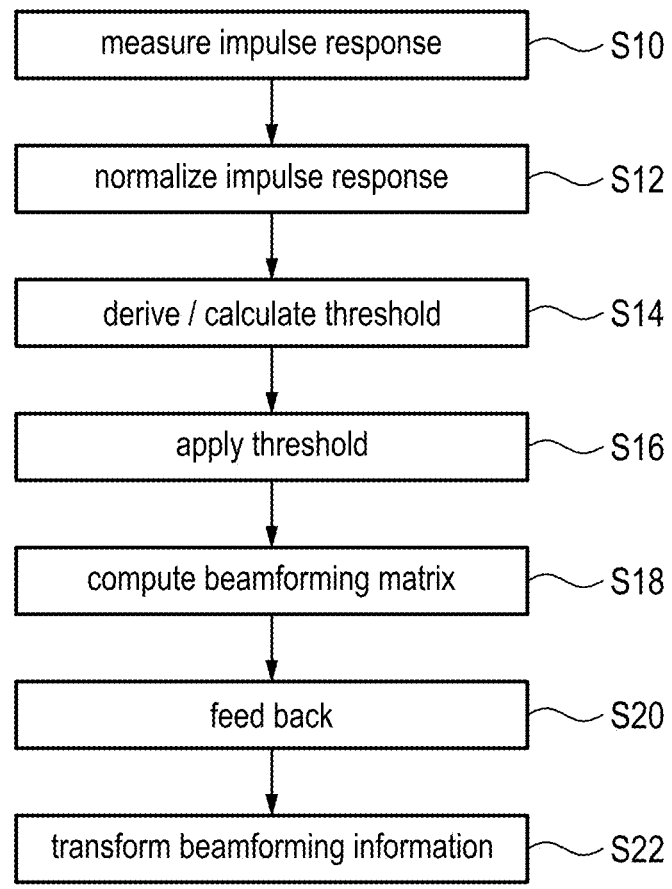
FIG. 6 shows a flowchart of an implementation for compressing transmit beamforming information.

FIG. 6 shows a flowchart of a possible implementation of the embodiment in item e. above. In a first step S10 the impulse response is available in time-domain for each link, e.g. measure $h_{i,j}(n)$ with $1 \leq i \leq N_r$ and $1 \leq j \leq N_t$. In a second step S12 each impulse response is optionally normalized to its average power, i.e.

$$\tilde{h}_{i,j}(n) = h_{i,j}(n) \cdot 1/\sqrt{\sum_n |h_{i,j}(n)|^2}$$

In a third step S14 a predefined or derived threshold $\alpha$ is selected, which defines the minimum magnitude of a tap of each $\tilde{h}_{i,j}(n)$ to be considered as significant. In a fourth step S16 a threshold is applied to each $\tilde{h}_{i,j}(n)$ in order to extract a set of significant taps. The set of significant taps $h_{i,j}^{SIG}$ includes the complex-valued impulse response value and the respective time index $n^{SIG}$. In more detail, $n^{SIG}$ is determined by evaluating $|\tilde{h}_{i,j}(n_0)|$ for each i and j for fixed $n_0$. If any $|\tilde{h}_{i,j}(n_0)|$ exceeds threshold $\alpha$, the tap $n_0$ is considered to be significant and included to the set $n^{SIG}$. The associated significant impulse response taps for $n_0$ are given by $\tilde{h}_{i,j}(n_0)$ and included to $h_{i,j}^{SIG}$.

In a fifth step S18 for each channel matrix $H^{SIG}$ defined by $h_{i,j}^{SIG}$ for all i and j, a beamforming matrix V (including an optional compression such as Givens rotation if applicable) is computed:

$$V^{SIG} = BF(h_{i,j}^{SIG}).$$

Assuming that $n^{SIG}$ contains S entries, S beamforming matrices $V^{SIG}$ are computed from each $H^{SIG}$. In a sixth step S20 the elements in $n^{SIG}$ and $V^{SIG}$ are fed back to the transmitter, i.e. ($V^{SIG}$, $n^{SIG}$). In a seventh step S22 the transmitter transforms the received beamforming information in frequency domain by $$V(\omega) = \sum_{s=1}^{S} V^{SIG}(s) \cdot e^{-j\omega T \cdot n^{SIG}(s)}$$

where T denotes the tap spacing or sampling interval of the impulse response. As OFDM transmitters typically apply discrete Fourier transform, the above equation is evaluated at $\omega = 2\pi k / N_{sub}$ only with k being the subcarrier index and $N_{sub}$ the total number of subcarriers. It should be noted that depending on implementation the second step S12 may be omitted.

Figure 7:
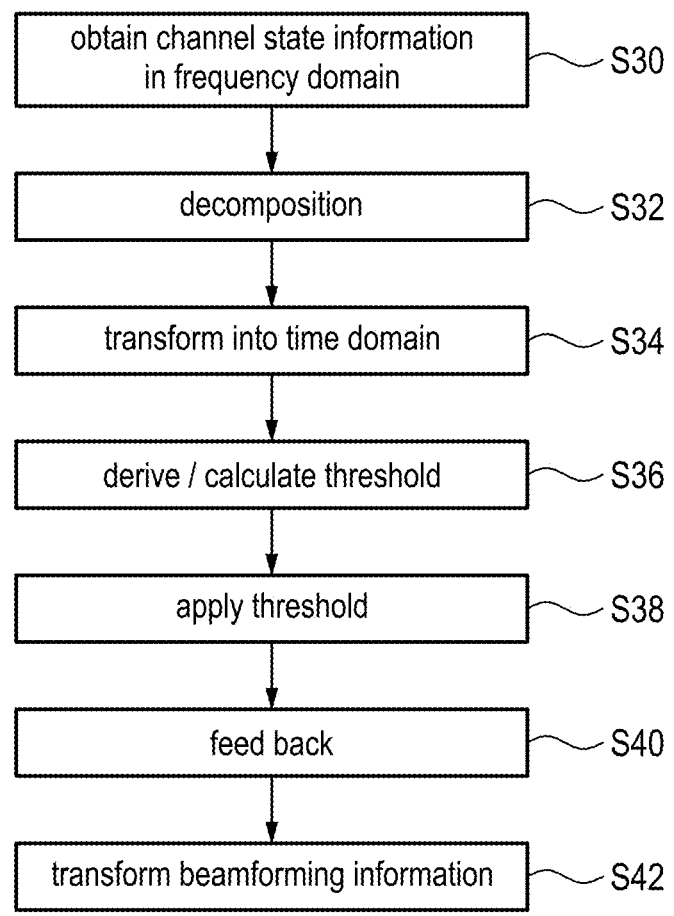
FIG. 7 shows a flowchart of another implementation for compressing transmit beamforming information.

FIG. 7 shows a flowchart of a possible implementation of the embodiment in item f. above. In a first step S30 the channel state information (CSI) is obtained in frequency domain for each link and each subcarrier k, i.e. $h_{i,j}^f(k)$ with $1 \leq i \leq N_r$ and $1 \leq j \leq N_t$ is measured (here matrices $H^t/V^t$ indicate representation in time domain, $H^f/V^f$ in frequency domain with $N_s = \min(N_t, N_r)$ and $1 \leq v \leq N_s$). In a second step S32 decomposition of $H^f(k)$ is performed to obtain $V^f(k)$ and $U^f(k)$ in frequency domain for each subcarrier k. Alternatively, the channel information may be obtained in time domain in the first step S30 then it has to be transformed into frequency domain first, before applying decomposition in second step S32.

In a third step S34 elements $v_{j,v}^f(k)$ are transformed back to time domain to obtain elements $v_{j,v}^t(n)$ for each tap n. In a fourth step S36 a predefined or specific threshold $\alpha$ is selected or derived, which defines the minimum magnitude of a tap of each $v_{j,v}^t(n)$ to be considered as significant (this step can be described as cluster detection).

In a fifth step S38 this threshold is applied to each $v_{j,v}^t(n)$ in order to extract a set of significant taps. The set of significant taps $v_{j,v}^{SIG}$ consists of the complex-valued elements and the respective tap index $n^{SIG}$ (it has to be noted that $n^{SIG}$ is of a single dimension and thus $v_{j,v}^{SIG}$ is a common set of taps for all elements). In more detail, $n^{SIG}$ is determined by evaluating $|v_{j,v}^t(n_0)|$ for each j and v for fixed $n_0$. If any $|v_{j,v}^t(n_0)|$ exceeds threshold $\alpha$, the tap $n_0$ is considered to be significant and included to the set $n^{SIG}$. The associated beamforming taps for $n_0$ are given by $v_{j,v}^t(n_0)$ and included to $v_{j,v}^{SIG}$. The threshold $\alpha$ might be pre-determined as a static value or may be derived dynamically by taking into account respective values of the transmit beamforming matrices (i.e. average channel power). This thresholding intends to include only relevant (with respect to achievable transmission rates) elements of the complete transmit beamforming information. In a sixth step S40 each significant taps set is fed back to the transmitter, i.e. ($v_{j,v}^{SIG}$, $n^{SIG}$) for all j and v. In a seventh step S42 the transmitter transforms the feedback information back into frequency domain and applies the resulting $\hat{V}^f_{j,v}(k)$ for each subcarrier in order to perform transmit beamforming. The same method may be applied on Givens-Representations of $V^f$-matrices. Then the additional step of Givens-Rotation may be included in step S32 and the inverse Givens-Rotation in step S42 respectively.

FIG. 8 shows a diagram of an exemplary embodiment of a Beamforming Feedback Control field, in particular of enhanced directional multi-gigabit (EDMG) Beamforming Feedback Control, which configures the EDMG Beamforming Feedback element as shown in Table 1 below.

Compression using Givens-Rotation can be obtained by finding:

$$D(1_{i-1} e^{j\varphi_{i,i}} \ldots e^{\varphi_{N_r-1,i}} 1) = \begin{bmatrix} I_{i-1} & 0 & \ldots & \ldots & 0 \\ 0 & e^{j\varphi_{i,i}} & 0 & \ldots & 0 \\ \vdots & 0 & \ddots & 0 & 0 \\ \vdots & \vdots & 0 & e^{j\varphi_{N_r-1,i}} & 0 \\ 0 & 0 & 0 & 0 & 1 \end{bmatrix} \text{ and}$$

$$G_{li}(\psi) = \begin{bmatrix} I_{i-1} & 0 & 0 & 0 & 0 \\ 0 & \cos(\psi) & 0 & \sin(\psi) & 0 \\ 0 & 0 & I_{l-i-1} & 0 & 0 \\ 0 & -\sin(\psi) & 0 & \cos(\psi) & 0 \\ 0 & 0 & 0 & 0 & I_{N_r-l} \end{bmatrix} \text{ such that}$$

$$V = \left[ \prod_{i=1}^{\min(N_c, N_r-1)} \left[ D_i(1_{i-1} e^{j\varphi_{i,i}} \ldots e^{j\varphi_{N_r-1,i}} 1) \prod_{l=i+1}^{N_r} G_{li}^T(\psi_{li}) \right] \right] \tilde{I}_{N_r \times N_c}.$$

with $I_n$ depicting the (n×n)-Identity matrix.

The fields shown in FIG. 8 have the following meaning:

The Nss field indicates the number of columns in a beamforming feedback matrix minus one.

The Nr field indicates the number of rows in a beamforming feedback matrix minus one.

Th Ncb field indicates the number of 2.16 GHz channels, the measurement was made for minus one.

The Grouping field indicates the number of subcarriers to be grouped into one:

Set to 0 for no grouping->$N_g=1$
Set to 1->$N_g=2$
Set to 2->$N_g=4$
Set to 3 for dynamic group width->Number of Elements is specified by Number of subcarriers/taps field.

The Feedback Type Field indicates which type of feedback is provided:

Set to 0->uncompressed feedback in frequency domain
Set to 1->compressed using Givens Rotation in frequency domain
Set to 2->uncompressed feedback in time domain
Set to 3->compressed feedback using Givens Rotation in time domain The Coefficient Size field indicates the quantization resolution in bit of the elements of Beamforming Feedback Matrices $$\left(b_\phi = \frac{N_b}{2} \text{ and } b_\psi = \frac{N_b}{2} + 2 \text{ bit}\right):$$

Set to 0 for $N_b=2$ ($b_\psi$, =1, $b_\phi$=3, for compressed feedback modes)
Set to 2 for $N_b=6$ ($b_\psi$, =3, $b_\phi$=5, for compressed feedback modes)
Set to 4 for $N_b=8$ ($b_\psi$, =4, $b_\phi$=6, for compressed feedback modes).

The Number of subcarriers/taps field specifies the number of taps/subcarriers present in the report minus one (only relevant when dynamic group width is used).

FIG. 9 shows a schematic diagram of a device to reconstruct $f_{i,approx}$ by using a bank of reconstructors for fixed group width and $N_{g,j} \in S_{FB}$. This arrangement might be a component of a reconstruction unit 43 as shown in FIG. 4. Optionally a reconstruction unit for subcarriers at the edge of channels or at the edge of channels being part of bonded channel which can have predefined values different than $N_g$ can be present and marked as dashed. The Grouping field may alternatively comprise more than two bits to indicate the number of subcarriers to be grouped into one, as illustrated in FIG. 9:

Set to 0 to indicate $N_g=2$
Set to 1 to indicate $N_g=4$ ...
Set to $N_I$ to indicate the largest grouping size $N_{g,max}=2^{N_1+1}$,
Set to $N_I+1$ (or to a value strictly larger than $N_1$ and strictly smaller than $2(N_{bg})$) to indicate dynamic grouping. In this case, the specific indexes of the subcarriers in absolute or differential form are presented in the Tap/carrier index field. The indexes should be such that the difference between any two adjacent subcarriers, present within the feedback and for which the following conditions hold they are not edge subcarriers for any channel or bonded channel they are not adjacent to the DC (direct current) subcarriers is one or corresponds to one of the groupings allowed and which are indicated by the grouping field. $N_{g,max}$ can be chosen based on offline analysis of the channel characteristics and $N_{bg}=\text{ceil}(\log_2(N_I+1))$ represents the number of bits required. In more advanced implementations the difference between any two adjacent subcarriers present in the feedback and satisfying the two conditions above can be a power of 2 larger than the ones defined in the grouping field or a multiple or divisor of these.

TABLE 1

| EDMG Beamforming Feedback element | | | |
|---|---|---|---|
| Field | Size | | Meaning |
| Element ID | 8 bits | | |
| Length | 8 bits | | |
| SNR | $SNR_1$ | 8 bits | Average SNR in STA sending Report for space-time-stream 1 |
| | $SNR_2$ | 8 bits | Average SNR in STA sending Report for space-time-stream 2 |
| | . . . | | |
| | $SNR_{N_{ss}}$ | 8 bits | Average SNR in STA sending Report for space-time-stream $N_{ss}$ |
| Beamforming Feedback Matrix | Beamforming Feedback matrix for subcarrier k = scidx(0)/for time domain tap #1 | $n_{bit}$ bits | Beamforming feedback matrix with $n_{bit}$ bits as in Table 3. Depicting transmit beamforming information in Time- of Fre-quency-Domain, depending on value of "Feedback Type" field in FIG. 8. |

TABLE 1-continued

EDMG Beamforming Feedback element

| Field | Size | | Meaning |
|---|---|---|---|
| | Beamforming Feedback matrix for subcarrier k = scidx(1)/ for time domain tap #2 | $n_{bit}$ bits | |
| | . . . | . . . | |
| | Beamforming Feedback matrix for subcarrier k = scidx($N_C$ – 1)/for time domain tap #$N_{taps}$ | $n_{bit}$ bits | |
| Tap Delay/ Carrier Index | Relative Delay of Tap #1/ carrier index stcidx(0) | Implementation specific | Only present in dynamic grouping mode (Grouping set to 3) |
| | Relative Delay of Tap #2/ differential carrier index [stcidx(0) – stcidx(1)] | Implementation specific | Only present in dynamic grouping mode (Grouping set to 3) |
| | . . . | . . . | |
| | Relative Delay of Tap #$N_{taps}$ – 1/differential carrier index [stcidx($N_C$ – 1)-stcidx($N_C$)] | Implementation specific | Only present in dynamic grouping mode (Grouping set to 3) |

With respect to the Beamforming Feedback Matrix it is noted that the order of angles for compressed feedback modes is defined in Table 4. For Feedback in non-compressed feedback mode, matrix elements might be vectorized and quantized using $N_b$ bits each for real- and imaginary parts and then placed one after each other (Re, Im, . . . ).

Naturally, the values in the Carrier Index field can be either relative indexes as presented or absolute values i.e., stcidx(0), stcidx(1), . . .

When the Aggregation field indicated that the feedback should be for an aggregated channel, the indexes within the Carrier Index field are ordered such that first the subcarrier index set corresponding to the lower 2.16 or 4.62 channel are indicated. These are then followed by the subcarrier indexes of the higher 2.16 or 4.62 channel, such that the total number of subcarriers feedback corresponds to the indication within the control field.

Alternatively, for the aggregation case the number of subcarriers within each of the channel can be signaled, in which case individual beamforming information and carrier index information can be sent for each channel.

TABLE 2

Subcarriers for which a Compressed Beamforming Feedback Matrix subfield is sent back

| $N_{CB}$ | Channel Number | $N_G$ | $N_C$ | Carriers scidx(0), scidx(1), . . . , scidx($N_C$ – 1) for which matrices are sent |
|---|---|---|---|---|
| 1 | 1 . . . 8 | 1 | 336 + 16 | All data and pilot tones indices, from lowest frequency to highest frequency. |
| | | 2 | | All data and pilot tones indices, from lowest frequency to highest frequency with every second entry skipped. |
| | | 4 | | Every fourth data and pilot tones indices, from lowest frequency to highest. |
| 2 | 9 . . . 15 | 1 | 734 + 36 | All data and pilot tones indices, from lowest frequency to highest frequency. |
| | | 2 | | All data and pilot tones indices, from lowest frequency to highest frequency with every second entry skipped. |
| | | 4 | | Every fourth data and pilot tones indices, from lowest frequency to highest. |
| 3 | 17 . . . 22 | 1 | 1134 + 56 | All data and pilot tones indices, from lowest frequency to highest frequency. |
| | | 2 | | All data and pilot tones indices, from lowest frequency to highest frequency with every second entry skipped. |
| | | 4 | | Every fourth data and pilot tones indices, from lowest frequency to highest. |
| 4 | 25 . . . 29 | 1 | 1532 + 76 | All data and pilot tones indices, from lowest frequency to highest frequency. |
| | | 2 | | All data and pilot tones indices, from lowest frequency to highest frequency with every second entry skipped. |
| | | 4 | | Every fourth data and pilot tones indices, from lowest frequency to highest. |

TABLE 3

Size of Beamforming Feedback matrix

| Feedback Type | Coefficient Size | Size (bits) |
|---|---|---|
| Non-compressed | $n_{bit}$ | $2 \times N_b \times N_{SS} \times N_r$ |
| Compressed | $n_{bit}$ | $N_a \times (b_\psi + b_\varphi)/2$, with $N_\varphi = \left(N_r \times \frac{N_r+1}{2} - N_r\right)$ and $N_\psi = \left(N_r \times \frac{N_r-1}{2}\right)$, $N_a = N_\psi + N_\varphi$ |

TABLE 4

Order of angles in the "Beamforming Feedback Matrix" field with angles from Givens-Rotation as described above.

| Size of V ($N_r \times N_c$) | Number of angles ($N_a$) | The order of angles in the "Beamforming Feed-back Matrix" field in Table 1 |
|---|---|---|
| (2 × 1) | 2 | $\varphi_{11}, \psi_{21}$ |
| (2 × 2) | 2 | $\varphi_{11}, \psi_{21}$ |
| (3 × 1) | 4 | $\varphi_{11}, \varphi_{21}, \psi_{21}, \psi_{31}$ |
| (3 × 2) | 6 | $\varphi_{11}, \varphi_{21}, \psi_{21}, \psi_{31}, \varphi_{22}, \psi_{32}$ |
| (3 × 3) | 6 | $\varphi_{11}, \varphi_{21}, \psi_{21}, \psi_{31}, \varphi_{22}, \psi_{32}$ |
| (4 × 1) | 6 | $\varphi_{11}, \varphi_{21}, \varphi_{31}, \psi_{21}, \psi_{31}, \psi_{41}$ |
| (4 × 2) | 10 | $\varphi_{11}, \varphi_{21}, \varphi_{31}, \psi_{21}, \psi_{31}, \psi_{41}, \varphi_{22}, \varphi_{32}, \psi_{32}, \psi_{42}$ |
| (4 × 3) | 12 | $\varphi_{11}, \varphi_{21}, \varphi_{31}, \psi_{21}, \psi_{31}, \psi_{41}, \varphi_{22}, \varphi_{32}, \psi_{32}, \psi_{42}, \varphi_{33}, \psi_{43}$ |
| (4 × 4) | 12 | $\varphi_{11}, \varphi_{21}, \varphi_{31}, \psi_{21}, \psi_{31}, \psi_{41}, \varphi_{22}, \varphi_{32}, \psi_{32}, \psi_{42}, \varphi_{33}, \psi_{43}$ |

An alternative for Table 2, containing the fixed size, may look as follows (indicated as Table 2'), where $s_{CB=i}^{(N_g)}$ denotes the subcarrier set for grouping size $N_g$ and channel bonding factor CB=i

TABLE 2'

Subcarriers for which a Compressed Beamforming Feedback Matrix subfield is sent back, with DC subcarrier indices dcidx = [−1, 0, 1], when Agreggation field = 0

| $N_{CB}$ | Channel Width | $N_C$ | Carriers scidx(0), scidx(1), . . . , scidx($N_C$ − 1) for which matrices are sent. Notation $l_b$:i:$u_b$ indicates a vector of integers from lower bound $l_b$ to upper bound $u_b$ with a step size of i, starting from min{$|l_b|$, $|u_b|$}. |
|---|---|---|---|
| 1 | 2.16 | $N_{c1}^{(N_g)} = (k_{CB1}+1) \cdot 2$ | $S_{CB=1}^{(N_g)} = [-177, -N_g k_{CB1} - 2: N_g:-2, 2:N_g:N_g k_{CB1} + 2:177]$ |
| 2 | 4.32 | $N_{c2}^{(N_g)} = N_{c1}^{(N_g)} + 2(k+1)$ | $S_{CB=2}^{(N_g)} = [-386, -N_g k_{CB2} - 177:N_g:-N_g - 177, S_{CB=1}^{(N_g)}, N_g + 177:N_g:N_g k_{CB2} + 177, 386]$ |
| 3 | 6.48 | $N_{c3}^{(N_g)} = N_{c2}^{(N_g)} + 2(k_{CB3}+1)$ | $S_{CB=3}^{(N_g)} = [-596, -N_g k_{CB3} - 386:N_g:-N_g - 386, S_{CB=2}^{(N_g)}, N_g + 177:N_g:N_g k_{CB=3} + 177, 386]$ |
| 4 | 8.64 | $N_{c4}^{(N_g)} = N_{c3}^{(N_g)} + 2(k_{CB4}+1)$ | $S_{CB=4}^{(N_g)} = [805, -N_g k_{CB4} - 596:N_g:-N_g - 596, S_{CB=3}^{(N_g)}, N_g + 596,:N_g:N_g k_{CB4} + 596, 805]$ |

In Table 2' $k_{CB1}$, $k_{CB2}$, $k_{CB3}$ and $k_{CB4}$ represent the largest positive integers such that $N_g k_{CB1}+2<177$, $N_g k_{CB2}+177<386$, $N_g k_{CB3}+386<596$ and $N_g k_{CB4}+596<805$, respectively.

When the feedback is for an aggregated channel i.e., 2.16+2.16 or 4.32+4.32, the subcarrier indexes are shown in Table 2", where $S_{CB=}^{(N_g)}(L), S_{CB=}^{(N_g)}(H)$ indicate that the indexes are the ones defined by $S_{CB=1}^{(N_g)}$ but are applied to the lower and respectively higher 2.16 GHz channel. Similarly $S_{CB=}^{(N_g)}(L)$ and $S_{CB=2}^{(N_g)}(H)$ indicate that the indexes are the ones defined by $S_{CB}^{(N_g)}$ but are applied to the lower and respectively higher 4.32 GHz channel.

TABLE 2"

Subcarriers for which a Compressed Beamforming Feedback Matrix subfield is sent back, with DC subcarrier indices dcidx = [−1, 0, 1], when Agreggation field

| $N_{CB}$ | Channel Width | $N_C$ | Carriers scidx(0), scidx(1), . . . , scidx($N_C$ − 1) for which matrices are sent. Notation $l_b$:i:$u_b$ indicates a vector of integers from lower bound $l_b$ to upper bound $u_b$ with a step size of i, starting from min{$\|l_b\|, \|u_b\|$}. |
|---|---|---|---|
| 1 | 4.32 | $N_{c2}^{(Ng)}$ | $S_{CA,1}^{(Ng)} = [S_{CB-1}^{(Ng)}(L), S_{CB-1}^{(Ng)}(H)]$ |
| 2 | 8.64 | $N_{c4}^{(Ng)}$ | $S_{CA,2}^{(Ng)} = [S_{CB-2}^{(Ng)}(L), S_{CB-2}^{(Ng)}(H)]$ |

Tables 2' and 2" show examples of carrier index sets for the reduced beamforming feedback report, in which the construction starts from center (subcarriers adjacent to DC sub-carriers) and goes towards the edges. Similarly the construction can also start from the edges and move towards the center and subset indexes can be inferred in similar manner.

One possible implementation at the receiver for CB=i can be to first consider the reduced set to be $S_{CB=i}^{(Ng)}$ with the largest grouping size and check the error criterion. For adjacent subcarriers, where this is not satisfied consider then subcarrier positions from $S_{CB=i}^{(Ng-1)}$. The procedure will then be repeated iteratively until the error criterion is satisfied for all adjacent subcarriers within the reduced set. By using the fixed subcarrier positions it is easy to decide between fixed and dynamic modes and also to switch between the two when needed, since the subcarrier set for $N_{g,1}$ is always included in that for $N_{g,2}$ if $N_{g,1} \leq N_{g,2}$.

The disclosed methods and devices allow to reduce the amount of information that is required to be fed back to the transmitter in order to perform transmit beamforming while maintaining substantially the same performance of the data link. This will increase overall performance (data throughput) of a communication system (such as a smartphone-laptop-client communication with an access point).

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. A receiving device for use in a wireless OFDM communication system, said receiving device comprising:
   two or more receive antennas for receiving OFDM signals received over a channel from a transmission device having two or more transmit antennas and applying transmit beamforming, and
   circuitry configured to
     perform channel estimation to estimate the channel,
     generate transmit beamforming information based on the channel estimation, said transmit beamforming information comprising beamforming information per subcarrier or time domain tap,
     determine a reduced set of transmit beamforming information from said transmit beamforming information, wherein said reduced set comprises beamforming information for a reduced set of subcarriers in the frequency domain or for a reduced set of taps in the time domain, wherein the subcarriers of said reduced set or the taps of said reduced set are determined based on an error criterion, and
     feed back the reduced set of transmit beamforming information to the transmission device.

2. The receiving device as defined in embodiment 1, wherein the circuitry is further configured to compress the generated transmit beamforming information and to determine the reduced set of transmit beamforming information from said compressed transmit beamforming information.

3. The receiving device as defined in embodiment 2, wherein the circuitry is further configured to compress at least part of the generated transmit beamforming information by applying a linear quantization or a matrix decomposition, in particular Givens-Rotation or Gauss-Jordan elimination, or by transforming the beamforming information of the generated transmit beamforming information into polar coordinates to obtain compressed transmit beamforming information comprising a beamforming information value per subcarrier or tap.

4. The receiving device as defined in any preceding embodiment, wherein the reduced set of transmit beamforming information comprises a beamforming information value or matrix per subcarrier of said reduced set of subcarriers in the frequency domain or a beamforming information value or matrix per tap of said reduced set of taps in the time domain.

5. The receiving device as defined in embodiment 4, wherein the circuitry is further configured to feed back the reduced set of beamforming information values or matrices and associated subcarrier values or indices indicating their position in the frequency domain or associated tap positions or delays of taps indicating their position or delay in the time domain.

6. The receiving device as defined in any preceding embodiment, wherein the circuitry is further configured to determine the reduced set of transmit beamforming information by one or more of
   differential processing of beamforming information between subcarriers or taps,
   grouping of beamforming information for two or more subcarriers or taps,
   interpolation or regression over groups beamforming information for a fixed or dynamic number of two or more subcarriers or taps, and
   reduction of channel state information in time domain.

7. The receiving device as defined in any preceding embodiment, wherein the circuitry is further configured to determine the reduced set of transmit beamforming information comprising beamforming information for a reduced set of subcarriers in the frequency domain by
   determining, starting with a reduced set of subcarriers containing a single subcarrier, an additional subcarrier, whose associated beamforming information should be included in the reduced set of transmit beamforming information, by computing an accumulated error between approximate beamforming information reconstructed using the reduced set of transmit beamforming information and the complete transmit beamforming information within a subcarrier interval, and
   including the beamforming information or its gradient, associated with said additional subcarrier position or with said subcarrier interval length, in the reduced set of beamforming information if the computed accumulated error exceeds a predetermined error threshold.

8. The receiving device as defined in embodiment 7, wherein the circuitry is further configured to compute the accumulated error by use of approximate beamforming information determined for the subcarriers in a subcarrier interval from the beamforming information associated with said additional subcarrier and the preceding subcarrier of the beamforming interval.

9. The receiving device as defined in embodiment 8, wherein the circuitry is further configured to compute the accumulated error by
   determining a distance metric, per subcarrier in the subcarrier interval, between the approximate beamforming information and the beamforming information of the complete transmit beamforming information,
   computing, per subcarrier in the subcarrier interval, the square of the absolute value of said distance metric, and
   summing, for all subcarriers in the subcarrier interval, said squares.

10. The receiving device as defined in any preceding embodiment,
   wherein the circuitry is further configured to determine the reduced set of transmit beamforming information comprising beamforming information for a reduced set of taps in the time domain by
   determining, starting with a reduced set of taps containing a single tap, an additional tap, whose associated beamforming information should be included in the reduced set of transmit beamforming information, by computing an accumulated error between approximate beamforming information reconstructed using the reduced set of transmit beamforming information and the complete transmit beamforming information within a tap interval, and
   including the beamforming information or its gradient, associated with said additional tap position or with said tap interval length, in the reduced set of beamforming information if the computed accumulated error exceeds a predetermined error threshold.

11. The receiving device as defined in embodiment 10, wherein the circuitry is further configured to compute the accumulated error by use of approximate beamforming information determined for the taps in a tap interval from the beamforming information associated with said additional tap and the preceding tap of the beamforming interval.

12. The receiving device as defined in embodiment 11, wherein the circuitry is further configured to compute the accumulated error by
   determining a distance metric, per tap in the tap interval, between the approximate beamforming information and the beamforming information of the complete transmit beamforming information,
   computing, per tap in the tap interval, the square of the absolute value of said distance metric, and
   summing, for all taps in the tap interval, said squares.

13. The receiving device as defined in any one of embodiments 8 to 11, wherein the circuitry is further configured to determine approximate beamforming information through interpolation between subcarriers or taps in the reduced set of transmit beamforming information.

14. The receiving device as defined in any preceding embodiment,
   wherein the circuitry is further configured to determine the reduced set of transmit beamforming information comprising beamforming information for a reduced set of taps in the time domain by
   selecting, by evaluation of an error criterion based on the obtained or estimated channel information in the time domain, taps having the strongest magnitude or a magnitude over a predetermined magnitude threshold,
   computing for each selected channel information beamforming information, and
   including the beamforming information of the selected taps in the reduced set of transmit beamforming information.

15. A receiving method for use in a wireless OFDM communication system, said receiving method comprising:
   receiving OFDM signals received over a channel from a transmission device having two or more transmit antennas and applying transmit beamforming, and
   performing channel estimation to estimate the channel,
   generating transmit beamforming information based on the channel estimation, said transmit beamforming information comprising beamforming information per subcarrier or time domain tap,
   determining a reduced set of transmit beamforming information from said transmit beamforming information, wherein said reduced set comprises beamforming information for a reduced set of subcarriers in the frequency domain or for a reduced set of taps in the time domain, wherein the subcarriers of said reduced set or the taps of said reduced set are determined based on an error criterion, and feeding back the reduced set of transmit beamforming information to the transmission device.

16. A transmission device for use in a wireless OFDM communication system, said transmission device comprising:

two or more transmit antennas for transmitting OFDM signals over a channel to a receiving device having two or more receive antennas, and circuitry configured to receive a reduced set of transmit beamforming information from the receiving device, wherein said reduced set comprises beamforming information for a reduced set of subcarriers in the frequency domain or for a reduced set of taps in the time domain, wherein the subcarriers of said reduced set or the taps of said reduced set are determined based on an error criterion, reconstruct transmit beamforming information from the received reduced set of transmit beamforming information, and apply transmit beamforming by use of the reconstructed transmit beamforming information.

17. The transmission device as defined in embodiment 16, wherein the circuitry is further configured to apply the transmit beamforming information by interpolating or approximating beamforming information in the frequency domain or in the time domain.

18. The transmission device as defined in embodiment 16 or 17, wherein the circuitry is further configured to set a flag in a preamble of a data transmission frame to indicate that transmit beamforming is applied for the current transmission frame.

19. A transmission method for use in a wireless OFDM communication system, said transmission method comprising:

transmitting OFDM signals over a channel to a receiving device having two or more receive antennas, receiving a reduced set of transmit beamforming information from the receiving device, wherein said reduced set comprises beamforming information for a reduced set of subcarriers in the frequency domain or for a reduced set of taps in the time domain, wherein the subcarriers of said reduced set or the taps of said reduced set are determined based on an error criterion, reconstructing transmit beamforming information from the received reduced set of transmit beamforming information, and applying transmit beamforming by use of the reconstructed transmit beamforming information.

20. A non-transitory computer-readable recording medium that stores therein a computer program product, which, when executed by a processor, causes the method according to embodiment 15 or 19 to be performed.

21. A computer program comprising program code means for causing a computer to perform the steps of said method according to embodiment 15 or 19 when said computer pro-gram is carried out on a computer.

The invention claimed is:

1. A receiving device for use in a wireless OFDM communication system, said receiving device comprising:

two or more receive antennas for receiving OFDM signals received over a channel from a transmission device having two or more transmit antennas and applying transmit beamforming, and circuitry configured to perform channel estimation to estimate the channel, generate transmit beamforming information based on the channel estimation, said transmit beamforming information comprising beamforming information per subcarrier or time domain tap, determine a reduced set of transmit beamforming information from said transmit beamforming information, wherein said reduced set comprises beamforming information for a reduced set of subcarriers in a frequency domain or for a reduced set of taps in a time domain, and feed back the reduced set of transmit beamforming information to the transmission device.

2. The receiving device of claim 1, wherein the circuitry is further configured to compress the generated transmit beamforming information and to determine the reduced set of transmit beamforming information from said compressed transmit beamforming information.

3. The receiving device of claim I, wherein the reduced set of transmit beamforming information comprises a beamforming information value or matrix per subcarrier of said reduced set of subcarriers in the frequency domain or a beamforming information value or matrix per tap of said reduced set of taps in the time domain.

4. The receiving device of claim 3, wherein the circuitry is further configured to feed back the reduced set of beamforming information values or matrices and associated subcarrier values or indices indicating their position in the frequency domain or associated tap positions or delays of taps indicating their position or delay in the time domain.

5. The receiving device of claim 1, wherein the circuitry is further configured to determine the reduced set of transmit beamforming information by one or more of differential processing of beamforming information between subcarriers or taps, grouping of beamforming information for two or more subcarriers or taps, interpolation or regression over groups beamforming information for a fixed or dynamic number of two or more subcarriers or taps, and reduction of channel state information in time domain.

6. The receiving device of claim 1, wherein the circuitry is further configured to determine the reduced set of transmit beamforming information comprising beamforming information for a reduced set of subcarriers in the frequency domain by determining, starting with a reduced set of subcarriers containing a single subcarrier, an additional subcarrier, whose associated beamforming information should be included in the reduced set of transmit beamforming information, by computing an accumulated error between approximate beamforming information reconstructed using the reduced set of transmit beamforming information and the complete transmit beamforming information within a subcarrier interval, and including the beamforming information or its gradient, associated with said additional subcarrier position or with said subcarrier interval length, in the reduced set of beamforming information if the computed accumulated error exceeds a predetermined error threshold.

7. The receiving device of claim 1, herein the circuitry is further configured to determine the reduced set of transmit beamforming information comprising beamforming information for all the reduced set of taps in the time domain by determining, starting with a reduced set of taps containing a single tap, an additional tap, whose associated beamforming information should be included in the reduced set of transmit beamforming information, by computing an accumulated error between approximate beamforming information reconstructed using the reduced set of transmit beamforming information and the complete transmit beamforming information within a tap interval, and including the beamforming information or its gradient, associated with said additional tap position or with said tap interval length, in the reduced set of beamforming information if the computed accumulated error exceeds a predetermined error threshold.

8. The receiving device of claim 7, wherein the circuitry is further configured to compute the accumulated error by use of approximate beamforming information determined for the taps in a tap interval from the beamforming information associated with said additional tap and the preceding tap of the beamforming interval.

9. The receiving device of claim 8, wherein the circuitry is further configured to compute the accumulated error by determining a distance metric, per tap in the tap interval, between the approximate beamforming information and the beamforming information of the complete transmit beamforming information, computing, per tap in the tap interval, a square of an absolute value of said distance metric, and summing, for all taps in the tap interval, said squares.

10. The receiving device of claim 1, wherein the circuitry is further configured to determine the reduced set of transmit beamforming information comprising beamforming information for all the reduced set of taps in the time domain by selecting, based on the obtained or estimated channel information in the time domain, taps having a strongest magnitude or a magnitude over a predetermined magnitude threshold, computing for each selected channel information beamforming information, and including the beamforming information of the selected taps in the reduced set of transmit beamforming information.

11. A receiving method for use in a wireless OFDM communication system, said receiving method comprising:

receiving OFDM signals received over a channel from a transmission device having two or more transmit antennas and applying transmit beamforming, and performing channel estimation to estimate the channel, generating transmit beamforming information based on the channel estimation, said transmit beamforming information comprising beamforming information per subcarrier or time domain tap, determining a reduced set of transmit beamforming information from said transmit beamforming information, wherein said reduced set comprises beamforming information for a reduced set of subcarriers in frequency domain or for a reduced set of taps in a time domain, and feeding back the reduced set of transmit beamforming information to the transmission device.

12. The receiving device of claim 1, wherein the circuitry is configured to determine the reduced set of transmit beamforming information based on the channel estimation.

13. The receiving device of claim 1, wherein the reduced set of transmit beamforming information comprises beamforming information for the reduced set of subcarriers in the frequency domain.

14. The receiving device of claim 13, wherein the circuitry is configured to determine the reduced set of subcarriers for which the transmit beamforming information is to be ted back based on the channel estimation.

15. The receiving device of claim 13, wherein the circuity is configured to determine a spacing between subcarriers in the frequency domain for the reduced set of subcarriers for which the transmit beamforming information is to be fed back based on the channel estimation.

\* \* \* \* \*